United States Patent
Chen et al.

(10) Patent No.: US 10,152,295 B2
(45) Date of Patent: Dec. 11, 2018

(54) METHODS FOR DISPLAYING IMAGE DATA IN A COMPUTER SYSTEM SUPPORTING MULTIPLE DISPLAYS

(71) Applicant: MediaTek Inc., Hsin-Chu (TW)

(72) Inventors: Chun-Hung Chen, Nantou County (TW); Chien-Chou Ko, Zhubei (TW); Chiung-Fu Chen, Hsinchu (TW); Yi-Cheng Chen, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 379 days.

(21) Appl. No.: 15/168,483

(22) Filed: May 31, 2016

(65) Prior Publication Data

US 2016/0350063 A1 Dec. 1, 2016

Related U.S. Application Data

(60) Provisional application No. 62/169,014, filed on Jun. 1, 2015.

(51) Int. Cl.
*G06F 3/14* (2006.01)

(52) U.S. Cl.
CPC .......... *G06F 3/1454* (2013.01); *G06F 3/1423* (2013.01); *G09G 2330/021* (2013.01); *G09G 2340/04* (2013.01); *G09G 2350/00* (2013.01); *G09G 2360/08* (2013.01); *G09G 2370/042* (2013.01)

(58) Field of Classification Search
CPC .... G06F 3/1423; G06F 3/1446; G06F 3/1454; G09G 2330/021; G09G 2340/04; G09G 2350/00; G09G 2360/08; G09G 2370/04
See application file for complete search history.

(56) References Cited

U.S. PATENT DOCUMENTS

| | | | | |
|---|---|---|---|---|
| 7,523,226 B2* | 4/2009 | Anderson | ............. | G08C 17/02 710/11 |
| 8,407,347 B2* | 3/2013 | Zhang | ...................... | G06F 3/14 709/226 |
| 2007/0296643 A1* | 12/2007 | Ben-Shachar | ........ | G06F 3/1438 345/1.1 |
| 2010/0033403 A1* | 2/2010 | Liao | ........................ | G06F 3/147 345/2.1 |

(Continued)

*Primary Examiner* — Amare Mengistu
*Assistant Examiner* — Crystal A Mathews
(74) *Attorney, Agent, or Firm* — McClure, Qualey & Rodack, LLP

(57) ABSTRACT

An electronic device and an associated method for displaying image data on a first display device of a first electronic device and a second display device of a second electronic device external of the first electronic device are provided. The method includes the steps of: determining whether image data to be displayed on the first and second display devices are the same; when the image data to be displayed on the first and second display devices are the same, estimating the first resource consumption required when the extension mode is selected for displaying the image data and the second resource consumption required when the mirror mode is selected for displaying the image data; and determining to display the image data on the first and second display devices in the extension mode or the mirror mode according to the first and second estimated resource consumption.

20 Claims, 5 Drawing Sheets

(56) References Cited

U.S. PATENT DOCUMENTS

| | | | | |
|---|---|---|---|---|
| 2012/0042252 A1* | 2/2012 | Neerudu | ............... | G06F 9/4445 |
| | | | | 715/733 |
| 2012/0176396 A1* | 7/2012 | Harper | .................. | G06F 3/1431 |
| | | | | 345/589 |
| 2013/0086528 A1* | 4/2013 | Lee | ...................... | G06F 3/1454 |
| | | | | 715/838 |
| 2013/0155126 A1* | 6/2013 | Lathrop | ................ | G06F 1/3218 |
| | | | | 345/690 |
| 2013/0283193 A1* | 10/2013 | Griffin | .................. | G06F 3/1446 |
| | | | | 715/761 |
| 2013/0322416 A1* | 12/2013 | Son | ...................... | H04W 84/02 |
| | | | | 370/338 |
| 2013/0328878 A1* | 12/2013 | Stahl | ..................... | G06F 3/1431 |
| | | | | 345/428 |
| 2014/0028726 A1* | 1/2014 | Dave | .................... | G06F 3/1438 |
| | | | | 345/660 |
| 2014/0253416 A1* | 9/2014 | Stahl | ..................... | G06F 3/1431 |
| | | | | 345/2.2 |
| 2014/0310611 A1* | 10/2014 | Lewin | .................. | G06F 3/1446 |
| | | | | 715/744 |
| 2015/0113181 A1* | 4/2015 | Law | ....................... | G06F 13/20 |
| | | | | 710/38 |
| 2015/0116362 A1* | 4/2015 | Aurongzeb | .............. | H04N 7/15 |
| | | | | 345/650 |
| 2016/0117268 A1* | 4/2016 | Griffin | ................ | G06F 13/4282 |
| | | | | 710/10 |
| 2016/0313967 A1* | 10/2016 | Han | ..................... | G06F 3/1446 |

* cited by examiner

METHODS FOR DISPLAYING IMAGE DATA IN A COMPUTER SYSTEM SUPPORTING MULTIPLE DISPLAYS

CROSS REFERENCE TO RELATED APPLICATIONS

This application claims the benefit of U.S. Provisional Application No. 62/169,014, filed on Jun. 1, 2015, the entirety of which is incorporated by reference herein.

BACKGROUND

Field of the Disclosure

The disclosure relates to image processing techniques, and more precisely, to methods and systems for displaying image data in a computer system supporting multiple displays.

Description of the Related Art

Currently, more and more computer systems become capable of supporting multiple displays. For any computer system with at least two display devices, image data to be displayed on the two display devices can be rendered in an extension mode and a mirror mode. In the extension mode, the image data to be displayed are rendered separately for the two display devices. In the mirror mode, the image data to be displayed are rendered for one of the display devices and then scaled to be displayed by the other display device with the same rendering content. Conventionally, a computer system may only allow rendering the image data with the extension mode if the two display devices have different rendering content (i.e., different image data to be displayed on the two display devices) or rendering the image data with the mirror mode if the two display devices have the same rendering content. However, once the determination is made, the rendering mode for rendering the image data may be fixed and may not be automatically and dynamically changed.

Accordingly, there is demand for methods and systems for displaying image data in a computer system supporting multiple displays to solve the aforementioned problem.

BRIEF SUMMARY

A detailed description is given in the following implementations with reference to the accompanying drawings.

In an exemplary implementation, a method for displaying image data on a first display device of a first electronic device and a second display device of a second electronic device external of the first electronic device is provided. The method includes the steps of: determining whether image data to he displayed on the first and second display devices are the same; when the image data to be displayed on the first and second display devices are the same, estimating a first resource consumption required when the extension mode is selected for displaying the image data and a second resource consumption required when the mirror mode is selected for displaying the image data; and determining to display the image data on the first and second display devices in the extension mode or the mirror mode according to the first and second estimated resource consumption.

In another exemplary implementation, a method for displaying image data in a computer system is provided. The computer system includes a first display device, a second display device and a rendering module coupled to the first and second display devices. The method performed by the rendering module includes the steps of: determining whether image data to be displayed on first and second display devices are the same; and when the image data to be displayed on the first and second display devices are the same, displaying the image data on the first and second display devices in the mirror mode in which the image data are rendered for a selected one of the first and second display devices and are scaled to obtain scaled image data to be mirrored to the other of the first and second display devices, wherein the selected display device is dynamically determined according to one or more display characteristics of the first and second display devices acquired from the first and second display devices.

In yet another exemplary implementation, an electronic device is provided. The electronic device has a first display device and selectively operates in an extension mode or a mirror mode with an external electronic device having a second display device. The electronic device includes a decoder and a determination module. The decoder is configured to provide image data to be displayed on the first and second display devices. The determination module is configured to determine whether the image data to be displayed on the first and second display devices are the same. When the image data to be displayed on the first and second display devices are the same, the determination module is configured to estimate the first resource consumption required when an extension mode is selected for displaying the image data and the second resource consumption required when the mirror mode is selected for displaying the image data and determine to display the image data on the first and second display devices in the extension mode or the mirror mode according to the first and second estimated resource consumption.

Other aspects and features of the present disclosure will become apparent to those with ordinary skill in the art upon review of the following descriptions of specific implementations of and the display systems and devices for carrying out the method.

BRIEF DESCRIPTION OF THE DRAWINGS

The disclosure can be more fully understood by reading the subsequent detailed description and examples with reference to the accompanying drawings, wherein.

DETAILED DESCRIPTION

This description is made for the purpose of illustrating the general principles of the disclosure and should not be taken in a limiting sense. It should be understood that the implementations may be realized in software, hardware, firmware, or any combination thereof.

Figure 1:
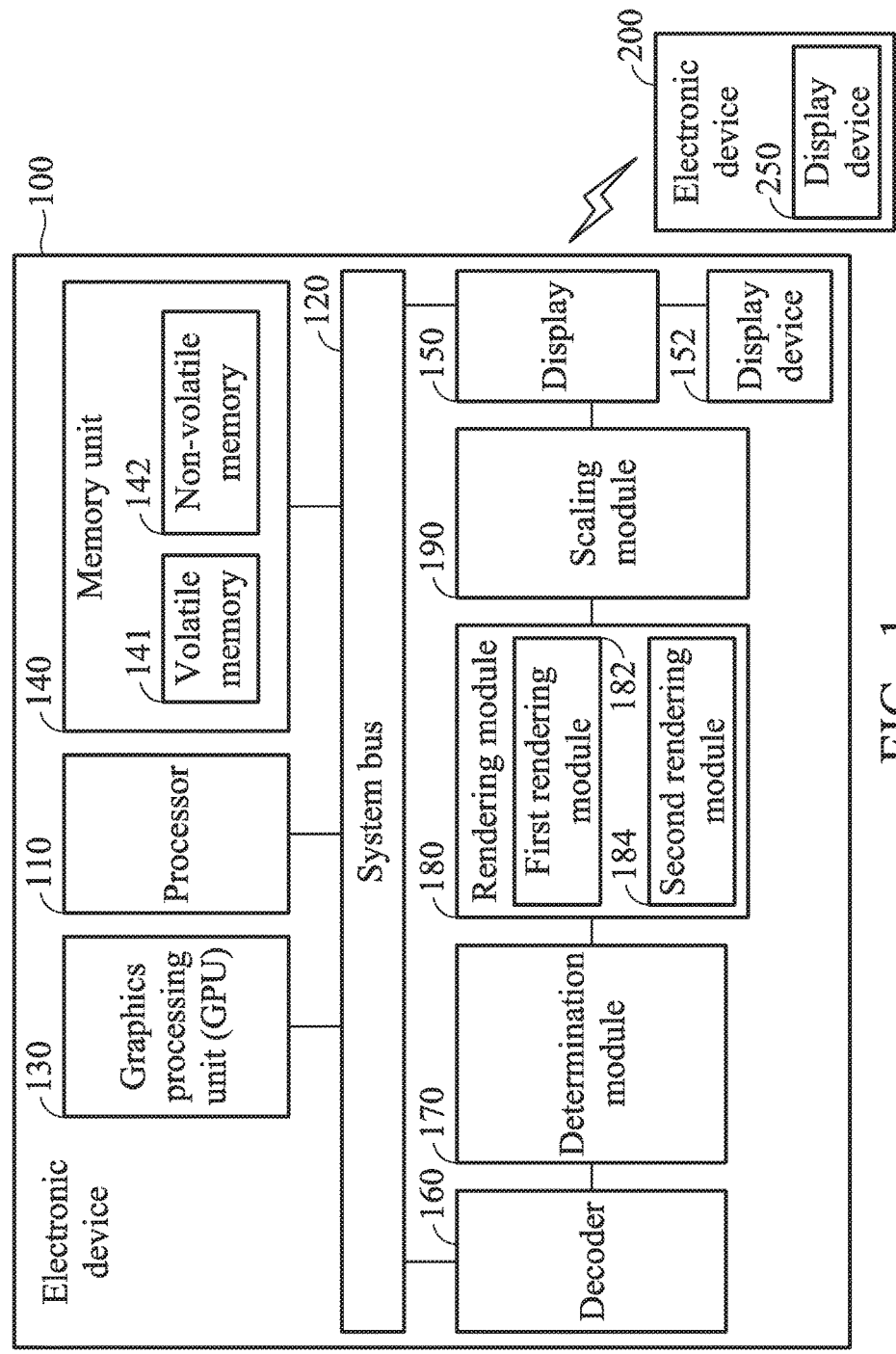
FIG. 1 is a block diagram illustrating the functional units of a display system according to an implementation of the disclosure.

FIG. 1 is a diagram of an electronic device in accordance with an implementation of the disclosure. The electronic device 100 can be a mobile device (e.g., a tablet computer, a smartphone, or a wearable computing device) or a laptop computer capable of acquiring images. The electronic device 100 can be implemented as multiple chips or a single chip, such as a system on chip (SOC). For example, the electronic device 100 comprises a processor 110, a system bus 120, a graphics processing unit (GPU) 130, a memory unit 140, a display 150, a decoder 160, a determination module 170, a rendering module 180 and a scaling module 190. The processor 110, the GPU 130, the decoder 160, the determination module 170, the rendering module 180, the scaling module 190 and the memory unit 140 can be coupled to each other through the system bus 120. The processor 110 may be a central processing unit (CPU) general-purpose processor, a digital signal processor (DSP), or any equivalent circuitry, but the disclosure is not limited thereto. The memory unit 140, for example, may include a volatile memory 141 and a non-volatile memory 142. The volatile memory 141 may be a dynamic random access memory (DRAM) or a static random access memory (SRAM), and the non-volatile memory 142 may be a flash memory, a hard disk, a solid-state disk (SSD), etc. For example, the program codes of the applications for use on the electronic device 100 can be pre-stored in the non-volatile memory 142. The processor 110 may load program codes of applications from the non-volatile memory 142 to the volatile memory 141, and execute the program code of the applications. The processor 110 may also transmit the graphics data to the GPU 130, and the GPU 130 may determine the graphics data or image data to be rendered on the display 150 (the details will be described later). It should be noted that, although the volatile memory 141 and the non-volatile memory 142 are illustrated as one memory unit, they can be implemented separately as different memory units. In addition, different numbers of volatile memory 141 and/or non-volatile memory 142 can be also utilized in different implementations. The display 150 can be a display circuit or hardware that can be coupled for controlling a display device 152. The display device 152 may include a driving circuit and a display panel and can be disposed internal to or external of the electronic device 100. To be more specific, in an implementation, the decoder 160, the determination module 170, the rendering module 180 and the scaling module 190 are each a stand-alone circuit that is external of the display 150.

The electronic device 100 can selectively operate in an extension mode or a mirror mode with an external electronic device 200 having a display device 250. For example, in one implementation, the electronic device 100 can be a mobile phone and the external electronic device 200 can be any electronic device supporting image mirroring and/or extension such as a TV, a projector and so on. In another implementation, the electronic device 100 and the external electronic device 200 can both be mobile phones, and the disclosure is not limited thereto. In the extension mode, the image data to be displayed are rendered separately for the electronic device 100 and the electronic device 200. In the mirror mode, the image data to be displayed can be rendered for one of the electronic device 100 and the electronic device 200 and then scaled to be displayed by the other with the same rendering content. For example, in the mirror mode, the image data to be displayed can be rendered for the electronic device 100 and then scaled to be displayed by the electronic device 200 or it can be rendered for the electronic device 200 and then scaled to be displayed by the electronic device 100.

The decoder 160 can be configured to provide image data to be displayed on a first display device (e.g., the display device 152) and a second display device (e.g., the display device 250 of the electronic device 200). The determination module 170 can be configured to determine whether the image data to be displayed on the first and second display devices are the same. For example, the image data to be displayed on the first display device provided by the decoder 160 can be an image A and the image data to be displayed on the first and second display devices are determined as the same when the image data to be displayed on the second display device provided by the decoder 160 is also the image A. When the image data to be displayed on the first and second display devices are the same, the determination module 170 is configured to estimate a first resource consumption required when the extension mode is selected for displaying the image data and a second resource consumption required when the mirror mode is selected for displaying the image data and determine to display the image data on the first and second display devices in the extension mode or the mirror mode according to the first and second estimated resource consumption.

The rendering module 180 is coupled to the decoder 160 and has circuitry for generating first image data to be displayed on the first display device and/or second image data to be displayed on the second display device according to the image data provided by the decoder 160. The scaling module 190 is coupled to the rendering module 180 and has circuitry for scaling one of the first image data and the second image data to generate scaled image data to be mirrored on the other of the first and second display devices. To be more specific, the scaling module 190 may perform an up-scaling operation to scale the image data to generate a larger image or ii may perform a down-scaling operation to scale the image data to generate a smaller image. The scaling module 190 can be used in the mirror mode. For example, in one implementation, if the first display device (e.g., a screen of a mobile phone) is of a resolution of 1920×1080 pixels and the second display device (e.g., a screen of a TV) is of a resolution of 3840×2160 pixels, the rendering module 180 can render the image data provided by the decoder 160 to generate a first image data with a resolution of 1920×1080 pixels to be displayed on the first display device and then the scaling module 190 can perform an up-scaling operation to scale the first image data to generate scaled image data with a resolution of 3840×2160 pixels to be mirrored on the second device. In another implementation, the rendering module 180 can generate a first image data with a resolution of 3840×2160 pixels to be displayed on the second display device and then the scaling module 190 can perform a down-scaling operation to scale the first image data to generate scaled image data with a resolution of 1920×1080 pixels to be mirrored on the first device.

The rendering module 180 can further include a first rendering module 182 and a second rendering module 184. The first rendering module 182 can be coupled to the decoder 160 and can have circuitry for generating first image data to be displayed on the first display device according to the image data provided by the decoder 160. The second rendering module 184 can be coupled to the decoder 160 and have circuitry for generating second image data to be displayed on the second display device according to the image data provided by the decoder 160.

Figure 2:
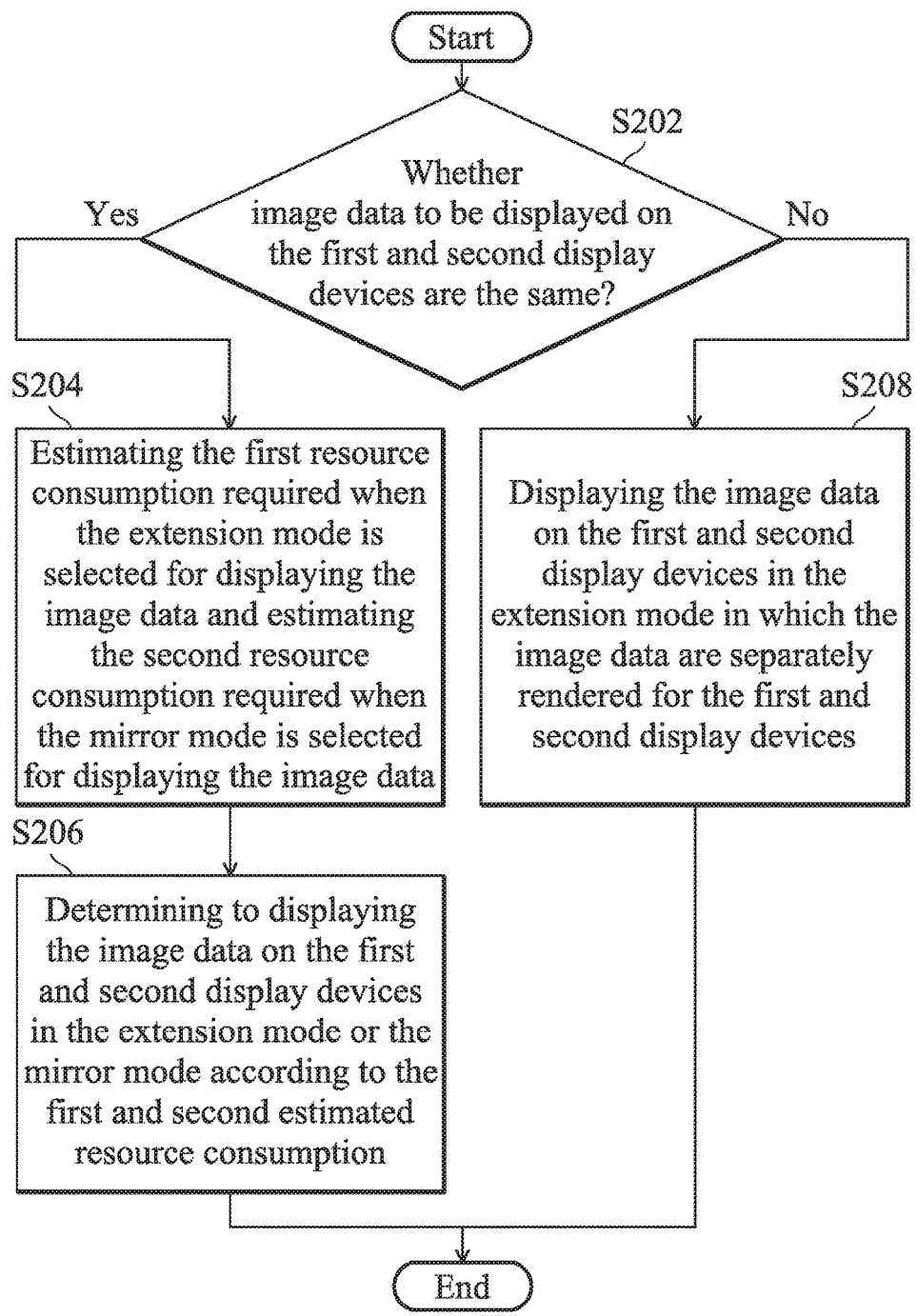
FIG. 2 is a flow chart of a method for displaying image data on a first display device of a first electronic device and a second display device of a second electronic device external of the first electronic device in accordance with another implementation of the disclosure.

FIG. 2 is a flow chart of a method for displaying image data on a first display device of a first electronic device and a second display device of a second electronic device external of the first electronic device, in accordance with another implementation of the disclosure. The electronic device 100 serving as the first electronic device and the electronic device 200 serving as the second electronic device of FIG. I is utilized here for explanation of the flow chart, which however, is not limited to be applied to the electronic device 100 only. More details about each step can be referred to implementations in connection to FIGS. I and 2 but not limited thereto. Moreover, the steps can be performed in different sequences and/or can be combined or separated in different implementations.

In step S202, a determination is made whether image data to be displayed on the first and second display devices are the same. The step S202 may be performed by determination module 170 in FIG. 1. For example, the image data to be displayed on the first display device provided by the decoder 160 can be an image A and the image data to be displayed on the first and second display devices are determined as the same when the image data to be displayed on the second display device provided by the decoder 160 is also the image A.

When the image data to be displayed on the first and second display devices are the same (Yes in step S202), in step S204, the first resource consumption required when the extension mode is selected for displaying the image data is estimated and the second resource consumption required when the mirror mode is selected for displaying the image data is estimated. The step S204 may be performed by determination module 170 in FIG. 1, for example. In some implementations, each of the first estimated resource consumption and the second estimated resource consumption may comprise estimated bandwidth usage, memory usage, power usage, or a combination thereof.

After the first and second estimated resource consumption are generated, in step S206, a determination is made to display the image data on the first and second display devices in the extension mode or the mirror mode according to the first and second estimated resource consumption. The step S206 may be performed by determination module 170 in FIG. 1, for example.

Figure 3:
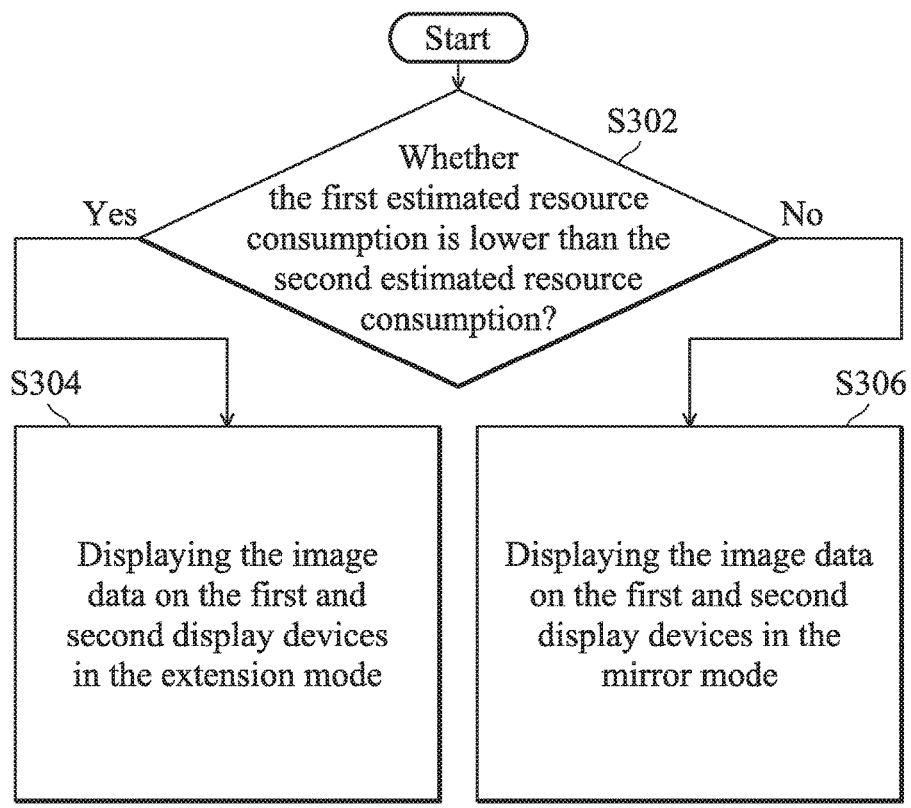
FIG. 3 is a flow chart of a method for determining whether to display the image data on the first and second display devices in the extension mode or the mirror mode according to the first and second estimated resource consumption in accordance with another implementation of the disclosure.

FIG. 3 is a flow chart of a method for determining whether to display the image data on the first and second display devices in the extension mode or the mirror mode according to the first and second estimated resource consumption in another implementation of the disclosure. The method may be performed by determination module 170 in FIG. 1, for example.

In step S302, a determination is made to determine whether the first estimated resource consumption is lower than the second estimated resource consumption. When the first estimated resource consumption is lower than the second estimated resource consumption (Yes in step S302), which indicates that displaying the image data with the extension mode consumes less resource than that with the mirror mode, it is determined in step S304 to display the image data on the first and second display devices in the extension mode. When the first estimated resource consumption is higher than the second estimated resource consumption (No in step S302), which indicates that displaying the image data with the extension mode consumes less resource than that with the mirror mode, it is determined in step S306 to display the image data on the first and second display devices in the mirror mode.

In contrast, when the image data to be displayed on the first and second display devices are not the same (No in step S202), a determination is made in step S208 to display the image data on the first and second display devices in the extension mode in which the image data are separately rendered for the first and second display devices. The step S208 may be performed by determination module 170 in FIG. 1, for example.

In some implementations, it is further obtained a system resource usage status required and dynamically switched between the extension mode and the mirror mode to display the image data on the first and second display devices according to the obtained system resource usage status required and the first and second estimated resource consumption by the determination module 170.

In some implementations, the determination module 170 may determine a best mode, selected from one of multiple modes, to be the mirror mode. To be more specific, under the mirror mode, the determination module 170 may further determine generate image data for which display device(s) to display, and mirror the images by up/down scaling the generated image data for another/other display devices according to each display's display characteristics. For example, in one implementation, when determining to display the image data with the mirror mode, the step of estimating the second resource consumption required may further comprise the steps of: determining one of a first mode and a second mode to be the mirror mode, wherein in the first mode the image data is rendered for the first display device and scaled to be mirrored to the second display device and in the second mode the image data is rendered for the second display device and scaled to be mirrored to the first display device; and estimating a third resource consumption required for the first mode or estimating a fourth resource consumption required for the second mode to be the second resource consumption according to the determination result.

In some implementations, one or more display characteristics of the first and second display devices can further be acquired and the step of determining which one of the first mode or the second mode is to be the mirror mode may further comprise determining which one of the first mode or the second mode is to be the mirror mode according to the one or more acquired display characteristics of the first and second display devices. For example, the one or more acquired display characteristics of the first and second display devices comprise one or more of the following predetermined factors of the first and second display devices: resolution, aspect ratio, color profile, frame rate, refresh rate and resource consumption.

In an implementation, the one or more acquired display characteristics can be the resolution of the first display device and that of the second display device, and the step of determining which one of the first mode or the second mode is to be the mirror mode according to the one or more acquired display characteristics of the first and second display devices may be performed by determining the first mode to be the mirror mode and rendering the image data for the first display device and down-scaling the rendered image data for the second display device when the resolution of the first display device is higher than the resolution of the second display device; and determining the second mode to be the mirror mode and rendering the image data for the second display device and down-scaling the rendered image data for the first display device when the resolution of the first display device is lower than the resolution of the second display device.

In another implementations, the step of determining which one of the first mode or the second mode is to serve as the mirror mode according to the one or more acquired display characteristics of the first and second display devices may be performed by obtaining the resolution difference between the resolution of the first display device and that of the second display device; determining the first mode to be the mirror mode and rendering the image data for the first display device and down-scaling the rendered image data for the second display device when the resolution of the first display device is higher than the resolution of the second display device by the resolution difference that is greater than a predetermined threshold value; and determining the second mode to be the mirror mode and rendering the image data for the second display device and down-scaling the rendered image data for the first display device when the resolution of the first display device is lower than the resolution of the second display device by the resolution difference that is greater than the predetermined threshold value, In some implementations, the step of determining which one of the first mode or the second mode will serve as the mirror mode according to the one or more acquired display characteristics of the first and second display devices may be performed by obtaining resolution difference between the resolution of the first display device and that of the second display device, determining the first mode to be the mirror mode and rendering the image data for the first display device and down-scaling the rendered image data for the second display device when the resolution of the first display device is higher than the resolution of the second display device by a first resolution difference that is greater than a first predetermined threshold value and the resolution of the second display device is lower than an original resolution of the image data by a second resolution difference that is not lower than a second predetermined threshold value, determining the second mode to be the mirror mode and rendering the image data for the second display device and up-scaling the rendered image data for the second display device when the resolution of the first display device is greater than the resolution of the second display device by the first resolution difference that is greater than the first predetermined threshold value and the resolution of the second display device is lower than the original resolution of the image data by the second resolution difference that is lower than the second predetermined threshold value, determining the second mode to be the mirror mode and rendering the image data for the second display device and down-scaling the rendered image data for the first display device when the resolution of the second display device is higher than the resolution of the first display device by the first resolution difference that is greater than the first predetermined threshold value and the resolution of the first display device is lower than the original resolution of the image data by the second resolution difference that is not lower than the second predetermined threshold value; and determining the first mode to be the mirror mode and rendering the image data for the first display device and up-scaling the rendered image data for the second display device when the resolution of the second display device is higher than the resolution of the first display device by the first resolution difference that is greater than the first pre-determined threshold value and the resolution of the first display device is lower than the original resolution of the image data by the second resolution difference that is lower than the second predetermined threshold value.

To be more specific, if the resolution difference between the first display device and the second display device is detected to be lower than a predetermined threshold, image data to be displayed can be still generated for the display with a higher resolution and a down-scaling for the generated image data is performed or it can be generated for the display with a lower resolution and an up-scaling for the generated image data is performed. Alternatively, the image data to be displayed can be generated for the first display device or the second display device regardless which one is higher or lower.

Figure 4:
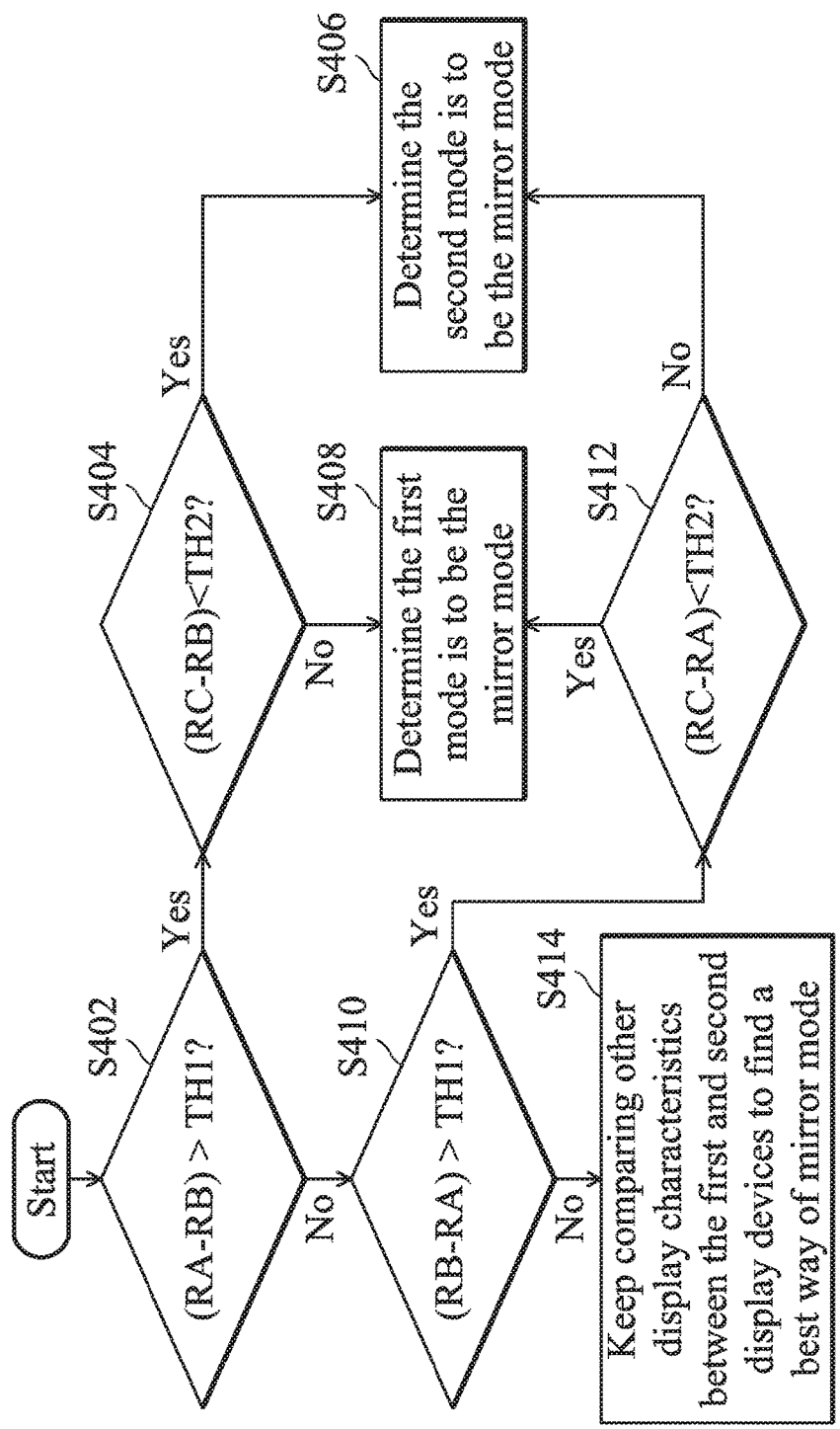
FIG. 4 is a flow chart of a method for determining which one of the first mode or the second mode will serve as the mirror mode according to the one or more acquired display characteristics of the first and second display device in accordance with another implementation of the disclosure.

FIG. 4 is a flow chart of a method for determining which one of the first mode and the second mode will serve as the mirror mode according to the one or more acquired display characteristics of the first and second display device in accordance with another implementation of the disclosure. The method may be performed by determination module 170 in FIG. 1, for example. In this implementation, it is assumed that the first display-device and the second display device have the same display content and the resolution of first display device is RA, the resolution of second display device is RB and the resolution of display content is RC. Further, TH1>0 and TH2>0 are thresholds. The resolution difference between the first display device and the second display device is defined as (RA-RE) or (RB-RA). First, it is determined if the resolution difference between the first display device and the second display device is detected to be higher than a predetermined threshold (i.e., (RA-RB)>TH1) (step S402). If the answer of step S402 is yes, it is further determined whether the resolution of the second display device is lower than an original resolution of the image data by a second resolution difference that is lower than a second predetermined threshold value (i.e., (RC-RB)<TH2) (step S404). If the answer of step S404 is yes, i.e. (RC-RB)<TH2, a determination is made as to serve the second mode as the mirror mode (step S406). Thus, the determination module 170 determines that rendering the image data for the second display device is the best way of mirror mode. If the answer of step S404 is no, i.e. (RC-RB)>=TH2, a determination is made as to serve the first mode as the mirror mode (step S408). Thus, the determination module 170 determines that rendering the image data for the first display device is the best way of mirror mode.

Similarly, if the answer of step S402 is no, i.e., (RA-RB)<=TH1), it is determined if the resolution difference between the first display device and the second display device is detected to be higher than the predetermined threshold (i.e., (RB-RA)>TH1) (step S410). If the answer of step S410 is yes, it is further determined whether the resolution of the first display device is lower than an original resolution of the image data by a second resolution difference that is lower than a second predetermined threshold value (i.e., (RC-RA)<TH2) (step S412). If the answer of step S412 is yes, i.e. (RC-RA)<TH2, a determination is made as to serve the first mode as the mirror mode (step S408). Thus, the determination module 170 determines that rendering the image data for the first display-device is the best way of mirror mode. If the answer of step S412 is no, i.e. (RC-RA)>=TH2, a determination is made as to serve the second mode as the mirror mode (step S406). Thus, the determination module 170 determines that rendering the image data for the second display device is the best way of mirror mode.

If the resolution difference between the first display device and the second display device is detected to be lower than a predetermined threshold (i.e., (RA-RB)<=TH1 and (RB-RA)<=TH1), the determination module 170 keeps comparing other display characteristics between the first and second display devices (e.g., (i.e. aspect ratio, color profile, frame rate, refresh rate and resource consumption)) to find a best way of mirror mode.

In some implementations, in cases where the acquired display characteristics comprise the resolution of both the first and second display devices and the predetermined factors of the first and second display device (i.e. aspect ratio, color profile, frame rate, refresh rate and resource consumption), then the step of determining which of the first mode or the second mode will be the mirror mode (according to the one or more acquired display characteristics of the first and second display devices) may be performed by obtaining the resolution difference between the resolution of each of the first and second display devices. When the obtained resolution difference is lower than the predetermined threshold value, a determination is made as to which of the first mode or the second mode will serve as the mirror mode. The determination is made by referring to the predetermined factors of the first and second display device.

In some implementations, the determination module 170 may re-determine to render the image data for the first display device or the second display device when detecting a change in the one or more acquired display characteristics of the first and second display devices. To be more specific, if one of the first and second display devices changes its display characteristics, the determination can be changed correspondingly, and without a personal setting/preference. For example, the determination module 170 may first determine to generate an image for a display A (e.g., the display device 152) and then down-scale the image data for a display B (e.g., the display device 250) as the resolution of the display A is higher than the resolution of the display B. Thereafter, if the display A decreases its resolution to be lower than the display B, or/and the display B increases its resolution to be higher than the display A, the changes can be detected by the determination module 170, and the determination can be changed in time. Accordingly, the determination module 170 can determine to generate an image for the display B and then down-scale the image data for the display A, without a personal setting in advance, to achieve the best display quality for both displays A and B.

In another implementation, a method for displaying image data in a computer system is provided, wherein the computer system comprises a first display device (e.g., the display device 152), a second display device (e.g., the display device 250) and a determination module (e.g., the determination module 170) coupled to the first and second display devices.

Figure 5:
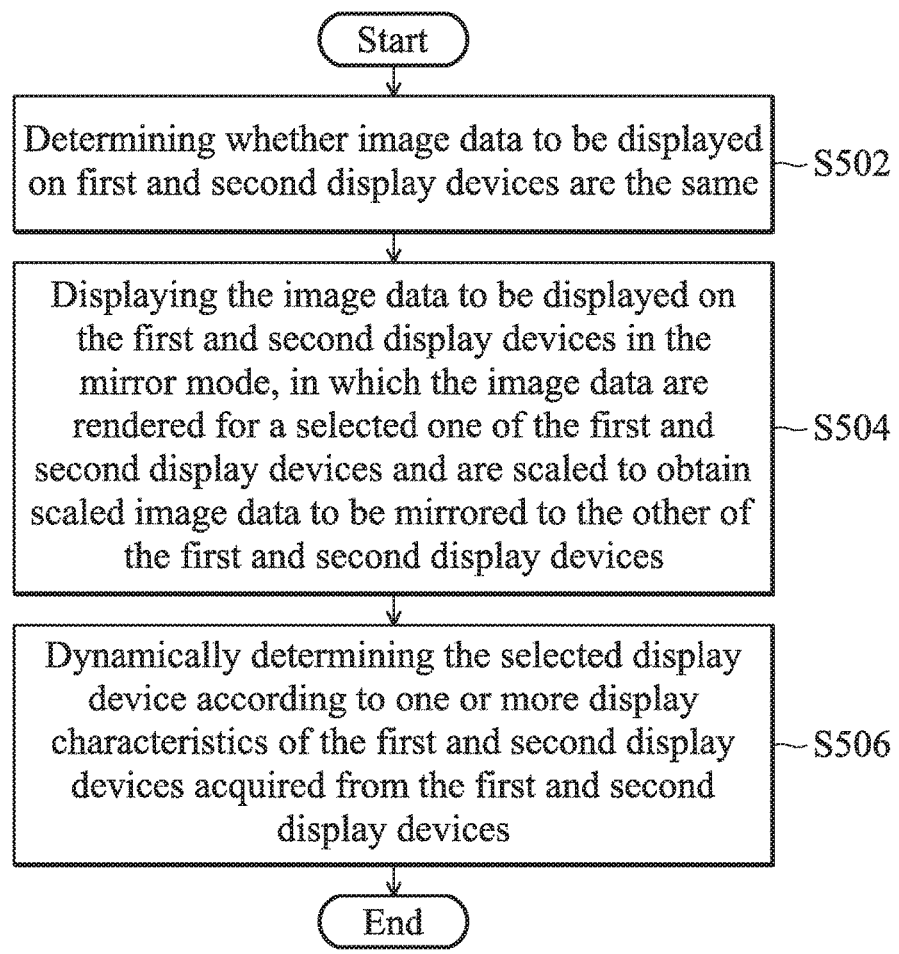
FIG. 5 is a flow chart of a method for displaying image data on a first display device of a first electronic device and a second display device of a second electronic device external of the first electronic device in accordance with another implementation of the disclosure.

FIG. 5 is a flow chart of a method for displaying image data on a first display device of a first electronic device and a second display device of a second electronic device external of the first electronic device in accordance with another implementation of the disclosure. The electronic device 100 serving as the first electronic device and the electronic device 200 serving as the second electronic device of FIG. 1 are utilized here for explanation of the flow chart, which, however, is not limited to be applied to the electronic device 100 only. The implementations connected to FIGS. 1 and 5 can be referred to for more details about each step, but the disclosure is not limited thereto. Moreover, the steps can be performed in different sequences and/or can be combined or separated in different implementations.

In step S502, a determination is made whether image data to be displayed on first and second display devices are the same. When the image data to be displayed on the first and second display devices are the same, the image data are to be displayed on the first and second display devices in the mirror mode, in which the image data are rendered for a selected one of the first and second display devices and are scaled to obtain scaled image data to be mirrored to the other of the first and second display devices (step S504). For example, in one implementation, the image data can be rendered for the first display device and the image data can then be scaled to obtain scaled image data to be mirrored on the second display device.

In step S506, the selected display device can be dynamically determined according to one or more display characteristics of the first and second display devices acquired from the first and second display devices. For example, in some implementations, the one or more acquired display characteristics comprise one or more of the following predetermined factors of the first and second display devices: resolution, aspect ratio, color profile, frame rate, refresh rate, and power consumption.

In an implementation, the acquired display characteristics can be the resolution of the first display device and the resolution of the second display device, and it is further determined to render the image data for the first display device and down-scale the rendered image data for the second display device when the resolution of the first display device is higher than the resolution of the second display device. Conversely, a determination is made to render the image data for the second display device and down-scale the rendered image data for the first display device when the resolution of the first display device is lower than the resolution of the second display device.

In some implementations, in cases where the acquired display characteristics comprise the resolution of the first display device and that of the second display device and the resolution of the first display device is higher than the resolution of the second display device, and the determination module 170 may obtain the resolution difference between the resolution of the first display device and that of the second display device, determine whether the obtained resolution difference is lower than a predetermined threshold value, and in response to the obtained resolution difference being lower than the predetermined threshold value, determine to render the image data for the first display device and down-scale the rendered image data for the second display device, or determine to render the image data for the second display device and up-scale the rendered image data for the first display device.

In some implementations, the determination module 170 may further determine the image data to be displayed in the extension mode when the first estimated resource consumption is lower than the second estimated resource consumption, and determine the image data to be displayed in the mirror mode when the first estimated resource consumption is higher than the second estimated resource consumption.

In view of the above implementations, an electronic device and an associated method for displaying image data on a first display device of the electronic device and a second display device of another electronic device external of the electronic device are provided. The determination module of the present disclosure can determine whether image data to be displayed on the first and second display devices are the same. When the image data to be displayed on the first and second display devices are the same, the determination module can estimate resource consumption required when displaying the image data with each of the extension mode and the mirror mode and then determine to display the image data on the first and second display devices in the extension mode or the mirror mode according to the estimated resource consumption. Accordingly, the determination for displaying in the extension mode or the mirror mode can be made dynamically and automatically without requiring any personal setting or preference and different display conditions and design requirements can be met, thus achieving better display effects for the display devices and providing more flexible and quick adjustment for rendering the image data to be displayed on multiple display s.

The implementations of methods that have been described, or certain aspects or portions thereof, may be practiced in logic circuits, or may take the form of program code (i.e., instructions) embodied in tangible media, such as floppy diskettes, CD-ROMS, hard drives, or any other machine-readable storage medium, wherein when the program code is loaded into and executed by a machine, such as a smartphone, a mobile phone, or a similar device, the machine becomes an apparatus for practicing the disclosure. The disclosed methods may also be embodied in the form of program code transmitted over some transmission medium, such as electrical wiring or cabling, through fiber optics, or via any other form of transmission, wherein when the program code is received and loaded into and executed by a machine, the machine becomes an apparatus for practicing the disclosure. When implemented on a general-purpose processor, the program code combines with the processor to provide a unique apparatus that operates analogously to specific logic circuits.

Use of ordinal terms such as "first" and "second" in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of preferred implementation, it is to be understood that the disclosure is not limited thereto. On the contrary, it is intended to cover various modifications and similar arrangements (as would be apparent to the skilled in the art). Therefore, the scope of the appended claims should be accorded the broadest interpretation so as to encompass all such modifications and similar arrangements.

What is claimed is:

1. A method for displaying image data on a first display device of a first electronic device and a second display device of a second electronic device external of the first electronic device, the method comprising:
   determining whether image data to be displayed on the first and second display devices are the same;
   when the image data to be displayed on the first and second display devices are the same, estimating a first resource consumption required when an extension mode is selected for displaying the image data and a second resource consumption required when a mirror mode is selected for displaying the image data; and
   determining to display the image data on the first and second display devices in the extension mode or the mirror mode according to the first and second estimated resource consumption.

2. The method of claim 1, wherein the step of determining to display the image data on the first and second display devices in the extension mode or the mirror mode according to the first and second estimated resource consumption comprises:
   determining to display the image data on the first and second display devices in the extension mode when the first estimated resource consumption is lower than the second estimated resource consumption; and
   determining to display the image data on the first and second display devices in the mirror mode when the first estimated resource consumption is higher than the second estimated resource consumption.

3. The method of claim 1, wherein each of the first estimated resource consumption and the second estimated resource consumption comprises one or more of estimated bandwidth usage, memory usage and power usage.

4. The method of claim 1, wherein the step of estimating the second resource consumption required further comprises;
   when determining to display the image data with the mirror mode, determining which one of a first mode or a second mode is to be the mirror mode, wherein in the first mode the image data is rendered for the first display device and scaled to be mirrored to the second display device and in the second mode the image data is rendered for the second display device and scaled to be mirrored to the first display device; and
   estimating a third resource consumption required for the first mode or estimating a fourth resource consumption required for the second mode to be the second resource consumption according to the determination result.

5. The method of claim 1, further comprising:
   obtaining a system resource usage status required; and
   dynamically switching between the extension mode and the mirror mode to display the image data on the first and second display devices according to the obtained system resource usage status required and the first and second estimated resource consumption.

6. The method of claim 4, wherein the step of determining which one of the first mode or the second mode is to be the mirror mode comprises:
   acquiring one or more display characteristics of the first and second display devices; and
   determining which one of the first mode or the second mode is to be the mirror mode according to the one or more acquired display characteristics of the first and second display devices.

7. The method of claim 6, wherein the one or more acquired display characteristics of the first and second display devices comprise one or more of the following predetermined factors of the first and second display device: resolution, aspect ratio, color profile, frame rate, refresh rate and resource consumption.

8. The method of claim 6, wherein the one or more acquired display characteristics comprise resolution of the first display device and that of the second display device, and the step of determining which one of the first mode or the second mode is to be the mirror mode according to the one or more acquired display characteristics of the first and second display de vices further comprises:
   determining the first mode to be the mirror mode and rendering the image data for the first display device and down-scaling the rendered image data for the second display device when the resolution of the first display device is higher than the resolution of the second display device; and
   determining the second mode to be the mirror mode and rendering the image data for the second display device and down-scaling the rendered image data for the first display device when the resolution of the first display device is lower than the resolution of the second display-device.

9. The method of claim 6, wherein the one or more acquired display characteristics comprise resolution of the first display device and that of the second display device, and the step of determining which one of the first mode or the second mode is to be the mirror mode according to the one or more acquired display-characteristics of the first and second display devices further comprises:

obtaining a resolution difference between the resolution of the first display device and that of the second display device;

determining the first mode to be the mirror mode and rendering the image data for the first display device and down-scaling the rendered image data for the second display device when the resolution of the first display device is higher than the resolution of the second display device by the resolution difference that is greater than a predetermined threshold value; and determining the second mode to be the mirror mode and rendering the image data for the second display device and down-scaling the rendered image data for the first display device when the resolution of the first display device is lower than the resolution of the second display device by the resolution difference that is greater than the predetermined threshold value.

10. The method of claim 6, wherein the one or more acquired display characteristics comprise resolution of the first display device and that of the second display device, and the step of determining which one of the first mode or the second mode is to be the mirror mode according to the one or more acquired display characteristics of the first and second display devices further comprises;

obtaining a first resolution difference between the resolution of the first display device and that of the second display device;

determining the first mode to be the mirror mode and rendering the image data for the first display device and down-scaling the rendered image data for the second display device when the resolution of the first display device is higher than the resolution of the second display device by a first resolution difference that is greater than the first predetermined threshold value and the resolution of the second display device is lower than an original resolution of the image data by a second resolution difference that is not lower than a second predetermined threshold value;

determining the second mode to be the mirror mode and rendering the image data for the second display device and up-scaling the rendered image data for the second display device when the resolution of the first display device is greater than the resolution of the second display device by a first resolution difference that is greater than the first predetermined threshold value and the resolution of the second display device is lower than the original resolution of the image data by a second resolution difference that is lower than the second predetermined threshold value;

determining the second mode to be the mirror mode and rendering the image data for the second display device and down-scaling the rendered image data for the first display device when the resolution of the second display device is higher than the resolution of the first display device by a first resolution difference that is greater than the first predetermined threshold value and the resolution of the first display device is lower than the original resolution of the image data by a second resolution difference that is not lower than the second predetermined threshold value; and determining the first mode to be the mirror mode and rendering the image data for the first display device and up-scaling the rendered image data for the second display device when the resolution of the second display device is higher than the resolution of the first display device by a first resolution difference that is greater than the first predetermined threshold value and the resolution of the first display device is lower than the original resolution of the image data by a second resolution difference that is lower than the second predetermined threshold value.

11. The method of claim 6, wherein the one or more acquired display characteristics comprise resolution of the first display device and that of the second display device and one or more of other predetermined factors of the first and second display device: aspect ratio, color profile, frame rate, refresh rate, and resource consumption, and the step of determining which one of the first mode or the second mode is to be the mirror mode according to the one or more acquired display characteristics of the first and second display devices further comprises:

obtaining a resolution difference between the resolution of the first display-device and that of the second display device;

when the obtained resolution difference is lower than the predetermined threshold value, determining which one of the first mode or the second mode is to be the mirror mode by referring to the one or more predetermined factors of the first and second display device.

12. The method of claim 6, further comprising:
re-determining to render the image data for the first display device or the second display device when detecting a change in the one or more acquired display characteristics of the first and second display devices.

13. A method for displaying image data in a computer system, wherein the computer system comprises a first display device, a second display device and a rendering module coupled to the first and second display devices, the method performed by the rendering module comprising:

determining whether image data to be displayed on first and second display devices are the same; and when the image data to be displayed on the first and second display devices are the same, displaying the image data on the first and second display devices in a mirror mode in which the image data are rendered for a selected one of the first and second display devices and are scaled to obtain scaled image data to be mirrored to the other of the first and second display devices, wherein the selected display device is dynamically determined according to one or more display characteristics of the first and second display devices acquired from the first and second display devices.

14. The method of claim 13, wherein the one or more acquired display characteristics comprise one or more of the following predetermined factors of the first and second display devices: resolution, aspect ratio, color profile, frame rate, refresh rate and power consumption.

15. The method of claim 13, wherein the one or more acquired display characteristics comprise resolution of the first display device and that of the second display device, and the method further comprises:

determining to render the image data for the first display device and down-scaling the rendered image data for the second display device when the resolution of the first display device is higher than the resolution of the second display device; and determining to render the image data for the second display device and down-scaling the rendered image data for the first display device when the resolution of the first display device is lower than the resolution of the second display device.

16. The method of claim 13, wherein the one or more acquired display characteristics comprise resolution of the first display device and that of the second display device and the resolution of the first display device is higher than the resolution of the second display device, and the method further comprises:

obtaining a resolution difference between the resolution of the first display device and that of the second display device;

determining whether the obtained resolution difference is lower than a predetermined threshold value; and in response to the obtained resolution difference being lower than the predetermined threshold value, determining to render the image data for the first display device and down-scaling the rendered image data for the second display device, or determining to render the image data for the second display device and up-scaling the rendered image data for the first display device.

17. An electronic device having a first display device and selectively operating in an extension mode or a mirror mode with an external electronic device having a second display device, the electronic device comprising:

a decoder, configured to provide image data to be displayed on the first and second display devices;

a determination module, configured to determine whether the image data to be displayed on the first and second display devices are the same, and when the image data to be displayed on the first and second display devices are the same, the determination module is configured to estimate a first resource consumption required when an extension mode is selected for displaying the image data and a second resource consumption required when a mirror mode is selected for displaying the image data and determine to display the image data on the first and second display devices in the extension mode or the mirror mode according to the first and second estimated resource consumption.

18. The electronic device of claim 17, wherein the determination module determines the image data to be displayed in the extension mode when the first estimated resource consumption is lower than the second estimated resource consumption and determines the image data to be displayed in the mirror mode when the first estimated resource consumption is higher than the second estimated resource consumption.

19. The electronic device of claim 17, wherein when the image data are determined to be displayed in the mirror mode, the electronic device further comprises:

a rendering module, coupled to the decoder, having circuitry for generating first image data to be displayed on the first display device and second image data to be displayed on the second display device according to the image data provided by the decoder;

a scaling module coupled to the rendering module, having circuitry for scaling one of the first image data and the second image data to generate scaled image data to be mirrored on the other of the first and second display devices.

20. The electronic device of claim 17, wherein when the image data are determined to be displayed in the extension mode, the electronic device further comprises:

a first rendering module, coupled to the decoder, having circuitry for generating first image data to be displayed on the first display device according to the image data provided by the decoder;

a second rendering module, coupled to the decoder, having circuitry for generating second image data to be displayed on the second display-device according to the image data provided by the decoder.

* * * * *